W. L. BLISS.
BATTERY CHARGING SYSTEM.
APPLICATION FILED MAY 25, 1911. RENEWED APR. 6, 1917.
1,246,855.
Patented Nov. 20, 1917.
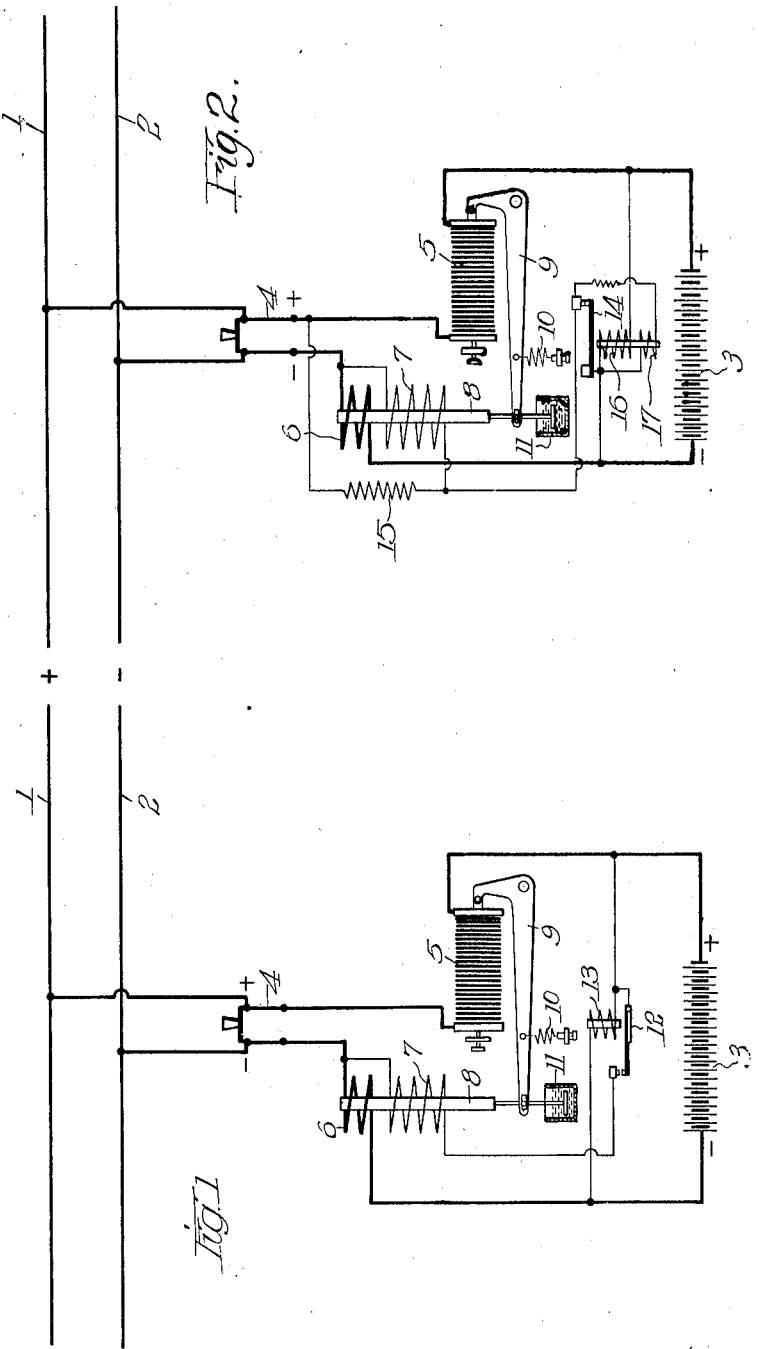

UNITED STATES PATENT OFFICE.

WILLIAM L. BLISS, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

BATTERY-CHARGING SYSTEM.

1,246,855.   Specification of Letters Patent.   Patented Nov. 20, 1917.

Application filed May 25, 1911, Serial No. 629,328. Renewed April 6, 1917. Serial No. 160,309.

*To all whom it may concern:*

Be it known that I, WILLIAM L. BLISS, a citizen of the United States, residing at Niagara Falls, in the county of Niagara and State of New York, have invented new and useful Improvements in Battery-Charging Systems, of which the following is a full, clear, concise, and exact description, reference being had to the accompanying drawing, forming a part of this specification.

My invention relates to means for charging storage batteries.

One of the objects of the invention is to provide an improved regulator for controlling the charging rate of storage batteries. One use for such a regulator is in stationary service, as in the charging of the batteries of an electric vehicle or in the charging of train lighting batteries which are charged at the terminals from the regular constant voltage charging lines in the so-called straight storage battery service. Another object of the invention is to provide automatic means for preventing overcharging of the battery.

In the accompanying drawings I have illustrated two embodiments of the invention. Other embodiments are, of course, contemplated.

In the drawings:—

Figure 1 illustrates a regulator having a stop charge relay.

Fig. 2 illustrates a regulator having a taper charge relay.

In both figures the mains 1, 2, are adapted to supply charging current to the batteries 3 when the switches 4 are closed. The variable pressure rheostat 5 in each case, is connected in series with the battery. Said rheostat may be assumed to be typical of any variable resistance. The resistance of the variable pressure rheostat 5 is controlled by a series controlling winding 6, and also under certain conditions, by the voltage responsive winding 7. These windings, when energized, act directly on the plunger 8 which is connected preferably to the bell crank lever 9 which in turn acts directly to vary the pressure applied to the variable pressure rheostat. The core 8 and the bell crank lever 9 are normally in lowermost position, due to their weight, assisted by the spring 10, whereby the resistance of the variable pressure rheostat is normally a minimum. The dash-pot 11 is adapted to steady the action of the movable parts.

In the form of regulator shown in Fig. 1, the voltage responsive winding 7 is normally inert, being open-circuited by the pivoted lever 12, which is controlled by the voltage coil 13, responsive to the voltage at the battery terminals. During the charging of the battery, the series winding 6 controls the variable pressure rheostat 5 so as to maintain substantially constant the current supplied to the battery 3. As the battery approaches a fully charged condition, however, the counter electro-motive force developed thereby causes an increased energization of the voltage coil 13, whereupon the pivoted relay armature 12 is attracted and closes the circuit of the shunt winding 7, whereupon the resistance of the variable pressure rheostat 5 increases to cut down the battery charging current.

In the form of regulator shown in Fig. 2, the charging of the battery is regulated by the series winding 6 which controls the variable pressure rheostat 5 to regulate to some constant value the current supplied to the battery. The shunt winding 7 is normally short-circuited by the short-circuiting device 14, which is illustrated as being a resilient reed carrying a contact, although other forms may be used, if desired. The resistance 15 prevents short-circuiting of the mains 1, 2, when said winding 7 is short-circuited. As the battery approaches a fully charged condition, the counter electro-motive force developed thereby causes an increased energization of the voltage responsive winding 16, which thereupon causes the resilient reed 14 to be drawn down, temporarily opening the short circuit around the winding 7 and permitting the energization thereof. The momentary energization of the winding 7 tends to cause a decrease in the pressure applied to the variable pressure rheostat 5 and a corresponding increase in the resistance thereof, whereupon the battery charging current tends to be reduced. This decrease in current reduces the energization of the coil 16, whereupon the resilient reed 14 is permitted to spring back and again short-circuit the winding 7. The cycle of operation just described is repeated rapidly, the vibrations of the reed 14 varying with the increasing tendency of the voltage, whereupon the mean energization of the winding 7 is regulated to the extent necessary to control the variable pressure rheostat 5 and thereby off-set this increasing tendency and gradually reduce or taper off the battery charging current. In order to render the operation of the device more sensitive, the auxiliary winding 17 is preferably provided, which may be connected in circuit in various ways to compensate for the varying reluctance of the air-gap between the resilient reed and the magnet 16 which causes the vibration thereof. In the connection shown, the auxiliary coil 17 is connected in the shunt circuit around the separable contacts and a resistance 18 is included in said shunt circuit. As long as the separable contacts are closed, the coil 17 is short-circuited. Whenever the contacts open, said coil is energized by current which flows from the positive side of the line through the resistance 15 and thence dividing, part of the current flowing through the resistance 18 and coil 17 to the negative side of the line, and the rest of the current flowing through the coil 7 to the negative side of the line. The resistance 18 limits the current flowing in the coil 17. It will be seen that the coil 17 is energized whenever the coil 7 is energized and is short-circuited whenever said coil is short-circuited. Both coils are energized whenever the resilient reed is drawn down. The coil 17 is wound differentially with respect to the coil 16 and accordingly opposes the same when energized, whereupon the resilient reed springs back very quickly to again close the short circuit. Accordingly, the vibrations are accelerated and the regulation takes place within very close limits.

It is apparent that either or both forms of regulator described and illustrated may be used in connection with the same mains or in the same charging station, depending on whether the stop charge or taper charge system of battery charging is preferred in each case.

It is further apparent that I do not desire to limit myself to the details shown and described, as various changes may be made without departing from the spirit of the invention, as expressed in the appended claims.

What I claim as new and desire to secure by Letters Patent of the United States is:

1. In a battery charging system, a storage battery to be charged, a source of charging current, a variable resistance connected in series with said battery, a current responsive winding also connected in series with said battery, mechanical connections between said winding and said resistance whereby said winding regulates said variable resistance to maintain substantially constant the current supplied to said battery, and means responsive to the counter electro-motive force of said battery for increasing said variable resistance to cut down the battery charging current.

2. A regulator for storage battery charging systems, comprising a variable resistance adapted to be connected in series with the battery to be charged, a current responsive winding also connected in series with said battery and adapted to regulate said resistance to maintain the battery charging current at a substantially constant value, and a voltage coil adapted to respond to the voltage at the battery terminals and vary said resistance to reduce said battery charging current when the battery has become fully charged.

3. A regulator for storage battery charging systems comprising a variable pressure rheostat adapted for connection in series with the battery to be charged, a series coil adapted to control said rheostat to maintain the battery charging current substantially constant during the charging of the battery, and a voltage responsive coil adapted when sufficiently energized in response to the increasing counter electro-motive force at the battery terminals, to effect an increase in the resistance of said rheostat, thereby reducing the battery charging current when the battery approaches a fully charged condition.

4. A charging current regulator for a storage battery including a variable pressure rheostat, a series winding normally controlling the same, a shunt winding also adapted to control said rheostat but normally inert, and a voltage responsive coil connected across the battery terminals and adapted when energized to cause the energization of said shunt coil for the purpose of increasing the resistance of said rheostat and thereby cutting down the battery charging current.

5. A charging current regulator for a storage regulator comprising a rheostat composed of a series of contacting resistance plates, a spring normally causing said plates to be pressed together, whereupon the resistance of said rheostat is maintained at a minimum value, a series winding and a shunt winding each adapted when energized, to oppose the action of said spring and increase the resistance of said rheostat, said series winding being connected in the battery charging circuit and normally operating to maintain substantially constant the current supplied to said battery, said shunt winding being connected across said battery charging circuit and normally inert but adapted when energized to increase the resistance of said rheostat to cut down the battery charging current, and a regulating winding connected across said charging circuit between said rheostat and said battery to permit the energization of said shunt winding when the battery reaches a predetermined voltage.

6. A system of regulation for battery charging including in combination with the battery a variable resistance adapted for connection in series therewith, a series coil adapted to control said resistance to maintain the battery charging current substantially constant as the charge progresses, a shunt coil also adapted to control said resistance, a short circuit around said shunt coil, separable contacts, one of which is adapted to vibrate rapidly to open and close said short circuit, and a voltage responsive winding adapted when sufficiently energized in response to the increasing counter electromotive force at the battery terminals to cause the vibration of said contact and to cause a change in said vibrations as its energization increases, whereby the energization of said shunt coil is gradually increased and the battery charging current is tapered off.

7. A system of regulation for battery charging including in combination with the battery a variable resistance adapted for connection in series therewith, a series coil adapted to control said resistance to maintain the battery charging current substantially constant as the charge progresses, a shunt coil also adapted to control said resistance, a short circuit around said shunt coil, separable contacts, one of which is adapted to vibrate rapidly to open and close said short circuit, a voltage responsive winding adapted when sufficiently energized in response to the increasing counter electro-motive force at the battery terminals to cause the vibration of said contact and to cause a change in said vibrations as its energization increases, and an auxiliary coil for accelerating said vibrations, whereby the energization of said shunt coil is gradually increased and the battery charging current is tapered off.

8. In a battery charging system, a source of supply, a storage battery connected thereto and a regulator having a variable resistance in series with said battery, a coil in series with the battery for varying the resistance to hold the battery charging current constant, a second coil connected across the battery terminals adapted when energized to modify the action of the current coil, and a relay having a controlling coil also connected across the battery terminals between the resistance and the battery, said relay controlling the excitation of said second coil and adapted to cause an increase in the energization of said second coil as the voltage of the battery tends to increase, whereby an increased modifying effect is exerted by said second coil and the battery current is tapered upon tendency to increase in the battery voltage.

In witness whereof, I have hereunto subscribed my name in the presence of two witnesses.

WILLIAM L. BLISS.

Witnesses:
A. H. ACKERMANN,
WM. A. FROBAYNE.